United States Patent Office 3,632,798
Patented Jan. 4, 1972

3,632,798
HEAT-TREATED PRODUCT OF ACRYLONITRILE COPOLYMER AND PROCESS FOR THE PREPARATION THEREOF
Ken-Ichi Morita, Kamakura-shi, Toshio Mizushima, Fujisawa-shi, and Hideji Kitagawa and Hiroshi Sakai, Iyo-gun, Japan, assignors to Toray Industries, Inc., Tokyo, Japan
No Drawing. Filed Feb. 4, 1969, Ser. No. 796,608
Claims priority, application Japan, Feb. 7, 1968, 43/7,124; Feb. 8, 1968, 43/7,474; July 13, 1968, 43/48,848
Int. Cl. C08f 15/22
U.S. Cl. 260—85.5       5 Claims

ABSTRACT OF THE DISCLOSURE

Product having improved physical properties which is treated at temperatures not lower than 50° C. of a novel copolymer which exhibit improved cyclic structure-forming ability, consisting of:

(i) acrylonittrile
(ii) 0.05–20 mol percent to the acrylonitrile of a hydroxymethylacrylic compound of the Formula 1 below:

(1) 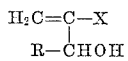
$$H_2C=C-X$$
$$\quad\quad |$$
$$\quad R-CHOH$$

(wherein X stands for a radical selected from the group consisting of cyano, carboxyl and carboxylate radicals; and R is a member of the group consisting of hydrogen, alkyl radicals of not over 12 carbons, aryl radicals of not over 10 carbons, cycloalkyl radicals of not over 12 carbons, and arylalkyl radicals of not over 12 carbons), and
(iii) 0–15 mol percent to the acrylonitrile of other copolymerizable monomer or monomers:

and also to the processes for preparation of such heat-treated product.

---

This invention relates to heat-treated products of novel type acrylonitrile copolymers which exhibit improved cyclic structure-forming ability having improved physical properties, and also to the processes for preparation of such products.

More particularly, the invention relates to the product which is treated at temperatures not lower than 50° C. of a copolymer consisting of:

(i) acrylonitrile
(ii) 0.05–20 mol percent to the acrylonitrile of a hydroxymethylacrylic compound of the Formula 1 below:

(1) 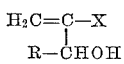
$$H_2C=C-X$$
$$\quad\quad |$$
$$\quad R-CHOH$$

(wherein X stands for a radical selected from the group consisting of cyano, carboxyl and carboxylate radicals; and R is a member of the group consisting of hydrogen, alkyl radicals of not over 12 carbons, aryl radicals of not over 10 carbons, cycloalkyl radicals of not over 12 carbons, and arylalkyl radicals of not over 12 carbons), and
(iii) 0–15 mol percent of the acrylonitrile of other copolymerizable monomers or monomers:

and also to the processes for preparation of such heat-treated product.

Heat-treated products of acrylonitrile polymer exhibit properties of semi-conductors, and are good prospective materials of wide utilities such as heat-, flame- and chemical-resistant fiber, film, and other similar shaped articles; catalysts for various reactions (e.g., dehydrogenation, dehydration, decomposition of hydrogen peroxide and formic acid, autoxidation, decomposition of hydrazine and nitrogen oxide); catalyst for purging exhaust gas of automobiles; photosensitive resin; reinforcing materials of refractories, etc.

It is known that the desirable properties such as heat resistance and conductivity of heat-treated products of acrylonitrile polymer are caused by their cyclic structures formed upon dehydrogenation and ring closure from the heat-treatment. [For example, refer to R. Houtz, Textile Research Journal, vol. 20, p. 786 (1950) and W. J. Burlant, J. Polymer Science, vol. 22, p. 249 (1956).]

However, for ring closure of polyacrylonitrile, the polymer is necessarily heat-treated at preferably higher temperatures, such as at lowest 200° C. Consequently, concurrent occurrence of objectionable side reactions other than the cyclization reaction, such as decomposition, in the heat treatment of polyacrylonitrile are more or less unavoidable. Such phenomena obviously interfere with sufficient formation of the cyclized structures.

Many proposals have been made in the purpose of overcoming such drawbacks and promoting the formation of cyclized structure.

For example, the cyclization reaction performed in the presence of various catalysts, or in the atmosphere of basic substances such as amines, etc. have been proposed. However, while it is possible to somewhat lower the heat-treating temperature for ring closure of polyacrylonitrile in accordance with those proposals, such practices are inevitably accompanied by other objectionable phenomena. For instance, the resulting heat-treated products become brittle, and their strength are markedly impaired.

There are also other proposals to utilize acrylonitrile copolymers which include, for example, copolymers of acrylonitrile with acrylic acid, methyl vinyl ketones, etc. [W. J. Burlant, J. Polymer Science, vol. 22, p. 249 (1956)]; copolymers of a acrylonitrile with acrolein, methacrolein, etc. (Japanese Official Patent Gazette, Publication No. 14032/64); and copolymers of acrylonitrile with monovinyl compounds such as methyl acrylate, methyl methacrylate, vinyl acetate, vinyl chloride, vinylidene chloride, 2-methyl-5-vinylpyridine, etc. (U.S. Pat. No. 3,285,696; British Pat. No. 911,542).

However, the heat-treated products of those copolymers still are invariably subject to one or other drawbacks, if different in degrees. For example, some of the products exhibited objectionable strength reduction. When the products are obtained as carbonized materials, the yield is low, and when they are obtained as carbon fiber, their strength and stiffness are unsatisfactory due to insufficient crystallinity.

We have engaged in extensive research works with the view to overcome those drawbacks and to provide heat-treated products of acrylonitrile copolymer having improved physical properties such as strength and stiffness as well as to provide a process for making such heat-treated products. As the result, we discovered that the novel type of acrylonitrile copolymer composed of the foregoing components (i) and (ii), and if desired, also (iii), exhibits improved cyclized structure-formng and large crystallites-forming ability under the heat treatment.

The copolymer quickly forms the cyclized structure under relatively mild heating conditions, and furthermore provides a carbonized material containing the large crystallites and having excellent physical properties such as strength and stiffness.

Furthermore, it is known that when heating of polyacrylonitrile is continued, abrupt thermal decomposition takes place at approximately 300° C. This decomposition (exothermic reaction) is markedly reduced in the acrylonitrile-hydroxymethylacrylic compound copolymer employed in this invention, and carbonized material can be obtained within a short time at a high yield in accordance with the invention. The fibers obtained after graphatization or carbonization show characteristically greater crystal size and higher crystallinity than carbon fibers from homopolymer or other copolymer of acrylonitrile.

Accordingly, therefore, the object of the invention is to provide heat-treated products having improved properties, which are obtained from novel type acrylonitrile copolymers of improved cyclized structure-forming ability, and also to provide a process for making same.

Still other many objects and advantages of the invention will become apparent from the following descriptions.

The acrylonitrile copolymer employed in the invention contains as another component, 0.05–20 mol percent, preferably 0.1–5 mol percent, of a hydroxymethylacrylic compound of the Formula 1 below:

(1) 

(wherein X stands for a radical selected from the group consisting of cyano, carboxyl and carboxylate radicals; and R is a member of the group consisting of hydrogen, alkyl radicals of not over 12, preferably not over 6, carbons, aryl radicals of not over 10 carbons, cycloalkyl radicals of not over 12 carbons, and arylalkyl radicals of not over 12 carbons). In the above Formula 1, more specific examples of R include hydrogen; aliphatic alkyl radicals of not over 12 carbons such as methyl, ethyl, propyl butyl, pentyl, octyl; alicyclic alkyl radicals of not over 12 carbons such as cyclohexyl, cyclooctyl, cyclododecyl, cyclopentyl; aryl radicals of not over 10 carbons, such as phenyl and naphthyl; and aryalkyl radicals of not over 12 carbons, such as benzyl, phenylethyl.

Also in the above Formula 1, X may be cyano, carboxyl, or carboxylate radical containing a hydrocarbon radical similar to the R above as the ester residue. As the carboxylate radical, particularly aliphatic alkyl ester radicals of carboxylic acid, inter alia, aliphatic alkyl ester radicals of not over 6 carbons, are preferred.

As the specific examples of the compounds of Formula 1 following hydroxymethylacrylic compounds may be named:

2-hydroxymethylacrylonitrile,
methyl 2-hydroxymethylacrylate,
ethyl 2-hydroxymethylacrylate,
butyl 2-hydroxymethylacrylate,
2-ethylhexyl 2-hydroxymethylacrylate,
2-(1-hydroxyethyl)acrylonitrile,
methyl 2-(1-hydroxyethyl)acrylate,
ethyl 2-(1-hydroxyethyl)acrylate,
butyl 2-(1-hydroxyethyl)acrylate,
2-(1-hydroxypropyl)acrylonitrile,
2-(1-hydroxypropyl)acrylic acid esters,
2-(1-hydroxybutyl)acrylonitrile,
2-(1-hydroxybutyl)acrylic acid esters,
2-(1-hydroxy-2-methylpropyl)acrylonitrile,
2-(1-hydroxy-2-methylpropyl)acrylic acid esters,
2-(1-hydroxyhexyl)acrylonitrile,
2-(1-hydroxyhexyl)acrylic acid esters,
2-(1-hydroxyoctyl)acrylonitrile,
2-($\alpha$-hydroxybenzyl)acrylonitrile,
methyl 2-($\alpha$-hydroxybenzyl)acrylate,
2-($\alpha$-hydroxy-p-methylbenzyl)acrylonitrile,
methyl 2-[(hydroxy)(cyclohexyl)methyl]acrylate,
methyl 2-hydroxyacrylic acid,
2-(1-hydroxyethyl)acrylic acid,
2-(1-hydroxypropyl)acrylic acid,
2-(1-hydroxybutyl)acrylic acid, and
2-($\alpha$-hydroxybenzyl)acrylic acid.

The compounds of Formula 1 as in the above can be obtained by reacting acrylonitrile, acrylic acid or an acrylic acid ester of Formula 2 below,

  (2)

(wherein X has the same signification as defined as to Formula 1)

with an aldehyde of Formula 3 below,

  (3)

(wherein R has the same signification as defined as to Formula 1), in the presence of an organic phosphorus compound catalyst, such as tricyclohexyl phosphine, tributyl phosphine, triethyl phosphine.

The reaction can be performed by contacting the compounds (1) and (2) with each other at a temperature ranging from room temperature to 250° C., preferably from 30 to 180° C., in the presence of a catalyst. It is preferred that the aldehyde (2) is used in an amount of 1 to 5 mol equivalents to the acryl compound (1). Generally, the catalyst is used in an amount of 1.001 to 0.1 mol per mol of the acryl compound (1). Although the use of a reaction medium is not indispensable for the above reaction, an inert solvent such as dioxane and tetrahydrofuran may be used. It is also preferred to make a polymerization inhibitor such as hydroquinone and pyrogallol co-existent in the reaction system.

The acrylonitrile copolymer used in the invention can be easily prepared by radical or anionic polymerization.

In that case, any of the initiators well known in the field of radical polymerization may be conveniently used. For example, peroxides such as benzoyl, lauroyl and hydrogen peroxides; azo-compounds such as azobisosibutyronitrile and $\alpha,\alpha'$-azobis-($\alpha,\alpha$-dimethylvalernitrile) and redox-type initiators such as potassium persulfatesodium hydrogensulfite, hydrogen peroxide-ferric chloride, ammonium persulfate-sodium hydrogensulfite, potassium persulfate-sodium hydrogenphospshate, etc.; can be used. Radiation may also be utilized, but it should be obvious that the method of copolymer formation is not limited to the foregoing. The amount of the radical initiator and other conditions for using the same can be determined similarly to the known radical polymerization. For example, an amount of the radical initiator to be used is 0.00001 to 0.01 part by weight based on the monomer. The polymerization temperature is in the range of 20 to 100° C. preferably 30 to 90° C.

The copolymerization ratio of the hydroxymethylacrylic compound to acrylonitrile ranges 0.05–20 mol percent, preferably 0.1–5 mol percent.

When the copolymerization ratio exceeds 20 mol percent, the required heat-treating temperature can be further lowered, but the heat-treated product tends to show objectionably great reduction in strength and other physical properties.

Furthermore the acrylonitrile copolymer employed in this invention may contain other copolymerizable monomer or monomers as the third component, as normally practiced in the preparation of polyacrylonitrile. The amount of such third component ranges 0–15 mol percent to acrylonitrile. Examples of such copolymerizable monomer include acrylate, methacrylate, vinyl acetate, acrylic acid, itaconic acid, butene-tricarboxylic acid, etc.

In accordance with the invention, it is preferred that the total of the components other than acrylonitrile in the copolymer is at most 15 mol percent to the acrylonitrile. The polymerization system may be any of solution, block, emulsion and suspension, the preferred systems being of emulsion and suspension.

In case of solution polymerization, any solvent which is conventionally employed in polymerization of acrylonitrile can be used, while preferred solvents include dimethylformamide, dimethylacetamide, dimethylsulfoxide, etc.

The product which is heat-treated at temperatures not lower than 50° C. of the invention can be obtained by heat-treating the abovedescribed novel type of acrylonitrile copolymer.

In accordance with the invention, the copolymer is either converted to a carbonized material (including graphite) by the heat treatment, or heated at lower temperatures to be converted to a useful heat-treated product. The latter heating may be performed as a pre-heating means of the former case.

Method of heating acrylonitrile copolymer is itself known. In the latter case of the above, the heat treatment is preferably performed in an oxidizing atmosphere such as of molecular oxygen-containing gas, such as air, at the temperatures ranging 50–300° C., preferably 90–250° C. Because, at temperatures below 50° C., sufficient ring closure is difficult. Whereas, if the system is heated to above 300° C. before the ring closure of the copolymer is sufficiently advanced to form cyclized structure, there is a danger of an abrupt exothermic reaction taking place to advance decomposition.

Also in case of converting the copolymer to a carbonized material, normally the copolymer is heated to at least 700° C., usually 700–3000° C., preferably 800–1500° C. If desired, the product may be further heated to the temperatures in the order of 2,500–3,000° C. to be converted to graphite which is one of carbonized materials. The heat treatment is conveniently performed by gradually raising the heating temperature. It is particularly preferred to first pre-heat the copolymer at 100–350° C. in an oxidizing atmosphere such as of air, and thereafter to subject the material to a heat treatment of at lowest 700° C. In the latter carbonizing heat treatment, it is normally performed with advantage under a reduced pressure and/or in a non-oxidizing gaseous atmosphere such as of nitrogen, hydrogen and argon.

The state of the acrylonitrile copolymer to be heated in accordance with the invention is not critical. It may be, for example, in the form of powder, granule, pellet, film or fiber, heat treatment of film or fiber, particularly fiber, being preferred.

In that case, the fiber may be treated in the form of tow or staple, or yarn, knit or woven good, or non-woven fabric. The material to be heated may be a blended product with other acrylonitrile fiber or cotton. The blend ratio of such other type of fiber is preferably no more than approximately 30%.

Incidentally, it is not recommended to add a delustrant such as titanium oxide or apply a spinning surfactant or the like, to the fiber, when flame resistance is to be imparted to the heated product, because such tends to render the resultant flame-resistant fiber brittle.

The fiber is preferably maintained under tension during the heat treatment, so as to provide carbonized fiber of excellent elasticity. Although it is also known that a higher draw ratio results in carbon graphite fibers of higher elasticity, in case the copolymerized fibers of this invention are used as starting material, a more greater influence is given to elasticity by drawing.

If desired, the heat treatment may be performed in a heating medium such as anthracene, silicone, halogenated hydrocarbons and glicerine. Since the reaction of ring closure of the first stage under heating is oxothermic, it is recommended that compact, aggregated state of the material should be avoided during the heating. Because, in either of the above cases if the material has a dense structure or is in compactly aggregated state, discharge of heat becomes difficult, and the material may shrink to take still denser structure.

The heat-treated product of the acrylonitrile copolymer in accordance with the invention is useful for the various, earlier described utilities.

Hereinafter several embodiments of the invention will be explained, referring to the working examples.

EXAMPLE 1

A copolymer composed of 99 mol percent of acrylonitrile and 1.0 mol percent of a 2-(1-hydroxyethyl)acrylonitrile compound was prepared by homogeneous solution polymerization method in dimethylsulfoxide, using azo-bisisobutyronitrile as the polymerization initiator. The spinning solution of the copolymer was formed into fiber by aqueous type wet spinning. The fiber (relative viscosity:1.4, strength:3.9 g./d., denier:3.5 d., knot strength:2.7 g./d.) was heated under tension at 220° C. for 3 hours in the air, and then to 1,000° C. during the period of 8 hours in nitrogen.

Further, an acryl fiber free of 2-(1-hydroxyethyl) acrylonitrile (relative viscosity:1.4, strength:3.6 d./g., denier:1.5 d.) was similarly treated (Control). The table below shows the results of changes in length and elasticity by the heat treatment at 1000° C.

TABLE.—INFLUENCES OF FIBER LENGTH ON ELASTICITY

| Change (percent) in fiber length by heat treatment at 220° C. | Elasticity (ton/mm.$^2$) | |
|---|---|---|
| | Invention copolymer | Control |
| −6 | 21 | 14 |
| 0 | 25 | 14 |
| +12 | 33 | 15 |

EXAMPLE 2

Copolymer fibers composed of 99 mol percent of acrylonitrile and 1 mol percent of the hydroxymethylacrylic compound as specified in the later given Table 1 (size:approximately 1.5 deniers, dry strength:4.00–4.30 g./d., devitrification ratio:0–0.2%) were stretched in the air, while exposed to gradually rising temperatures from 150° to 260° C. for 5 hours. Then the fibers were placed in an atmosphere of argon current, and the temperature was gradually raised to 1,000° C. over 10 hours, and then to 2,800° C. during the following 30 minutes. The strength and modulus of elasticity of the resultant carbon graphite fiber of each run were as given in Table 1 below. The measurements were performed with monofiber samples of 20 mm. at a drawing rate of 0.5 mm./min., using an Instron tester. Average of sixty measurements are shown in Table 1.

TABLE I

| Copolymer | Strength (kg./mm.$^2$) | Modulus of elasticity (ton/mm.$^2$) |
|---|---|---|
| 2-(1-hydroxymethyl)acrylonitrile | 320 | 78 |
| 2-(1-hydroxyethyl)acrylonitrile | 310 | 75 |
| 2-(1-hydroxybutyl)acrylonitrile | 320 | 74 |
| 2-(1-hydroxy-2-ethylhexyl)acrylonitrile | 301 | 71 |
| Methyl 2-(1-hydroxymethyl)acrylate | 295 | 72 |
| Butyl 2-(1-hydroxymethyl)acrylate | 285 | 70 |
| Methyl 2-(1-hydroxyethyl)acrylate | 265 | 71 |
| Methyl 2-(1-hydroxypropyl)acrylate | 272 | 69 |
| Methyl 2-(1-hydroxybenzyl)acrylate | 253 | 65 |
| No copolymer[1] | 128 | 41 |
| Methyl acrylate[1] | 105 | 20 |
| Methyl metacrylate[1] | 98 | 21 |
| Acrylic acid[1] | 145 | 38 |
| Methylvinyl keton[1] | 120 | 34 |
| Acrolein[1] | 180 | 35 |
| Metacrolein[1] | 150 | 32 |

[1] Control.

EXAMPLE 3

Copolymer fibers composed of 99.6 mol percent of acrylonitrile, 0.4 mol percent of sodium allylsulfonate, and 1 mol percent of 2-(1-hydroxyethyl) acrylonitrile (size:4 deniers, dry strength:3.83 g./d., dry elongation: 10.47%, knot strength:2.12 g./d., Young's modulus: 94.6 g./d.) were heated at 210° C. for 3 hours in the air, and then to 950° C. during the period of 2 hours at a reduced pressure.

Also similarly prepared fibers composed of 99.4 mol percent of acrylonitrile and 0.4 mol percent of sodium allylsulfonate (size: 3.22 deniers, dry strength: 3.41 g./d., dry elongation: 28.0%, knot strength: 1.88 g./d.) were heat treated under the identical conditions with the above.

The X-ray diffraction pattern with Kα rays of thus obtained carbonized fiber was photographed with a plate camera. The half width was 39.5° for the heat-treated fiber of this invention. In contrast, that of the blank heat-treated fiber was 43.8°, denoting that the larger growth of crystals took place in the former. The heat-treated fiber of the invention exhibited a modulus of elasticity of 21 tons/mm.$^2$ and a strength of 785 kg./mm.$^2$, while the blank specimen showed a modulus of elasticity of 9 tons/mm.$^2$ and a strength of 79 kg./mm.$^2$.

EXAMPLE 4

144.8 grams of acrylonitrile and 5.2 g. of 2-(1-hydroxybutyl)acrylonitrile were suspended in 550 ml. of distilled water. To the suspension 1.16 g. of potassium persulfate and 0.53 g. of sodium hydrogensulfite were added, and the system was polymerized at 38° C. for 20 hours. The copolymer obtained at the degree of polymerization of 93% had a logarithmic viscosity number of 2.487. The resulting white powder was dissolved in dimethylformamide, spread into a film form (50 microns in thickness), and subsequently heated at 120° C. for 2 hours in the air. The film became dark red in color, which was confirmed to have better ring closure, because it showed strong absorption at 1550–1690 cm.$^{-1}$ in the infrared absorption spectrum measurement. From the film a 1 cm. wide, 7 cm. long and 50$\mu$ thick piece was cut and tested with Shimazu Autograph 1M-100 tester. (Hereinafter all the tests were performed in this manner.) The specimen showed a strength of 1,100 kg./cm.$^2$ and an elongation of 5%, exhibiting a slight increase in strength compared with the specimen prior to the heating.

When a film similarly prepared from polyacrylonitrile of 192,000 in molecular weight was heated under identical conditions with the above, it colored only slightly yellow, and substantially no absorption was recognized at 1550–1690 cm.$^{-1}$ in its infrared absorption spectrum. From those facts it was confirmed that ring closure hardly progressed in that film. In order to turn the color of the latter film to dark red of the same deepness to that of the copolymer film, another heating at 200° C. for 15 minutes was required. Furthermore, so obtained film exhibited remarkably reduced strength and elongation, which were no more possible of measurement.

EXAMPLE 5

A copolymer powder of a logarithmic viscosity number of 2.102, which was obtained from a mixture of 98.5 mol percent of acrylonitrile and 1.5 mol percent of 2-(1-hydroxyethyl)acrylonitrile was heated at 120° C. in the air. Approximately after 15 minutes of the heating, the powder started to turn brownish in color, and became dark brown after 2 hours of the heating. Its infrared spectrum showed a strong absorption at 1550–1690 cm.$^{-1}$, and reduced absorption at 2220 cm.$^{-1}$ which indicates the presence of nitrile radical. Thus the favorable progress of ring closure was confirmed. When polyacrylonitrile powder of 150,000 in molecular weight was similarly treated, no coloring was observed, and the infrared spectrum of the heated powder showed no absorption at 1550–1690 cm.$^{-1}$.

EXAMPLE 6

A copolymer powder having a logarithmic viscosity number of 1.039, which was obtained from a mixture of 5 mol percent of 2-($\alpha$-hydroxybenzyl)acrylonitrile and 95 mol percent of acrylonitrile was heated at 110° C. in the air for 30 minutes. Whereupon the powder became brownish in color. When a film was prepared from the same copolymer prior to the heating, and heated at 120° C. for 2 hours in the air, the film turned blackish brown. Thus heated film had a strength of 650 kg./cm.$^2$, and an elongation of 2%.

EXAMPLE 7

A film was prepared from a copolymer having a logarithmic viscosity number of 1.936, which was obtained from a mixture of 99 mol percent of acrylonitrile and 1 mol percent of methyl 2-(1-hydroxyethyl)acrylate. When the film was heated at 130° C. for an hour in the air, it turned dark red in color. It showed a tensile strength of 950 kg./cm.$^2$ and an elongation of 4%, when measured similarly to Example 4.

EXAMPLES 8–12

Films from copolymers composed of 98.5 mol percent of acrylonitrile and 1.5 mol percent of the hydroxymethylacrylic compound were heat-treated in the air until they became dark red in color. The films had the strengths as indicated in Table 2. In all cases substantially no strength reduction was observed, compared with the same films prior to the heating.

TABLE 2

| Example No. | Hydroxymethylacrylic compound | Heating time and temperature required to turn the film dark red | | Tensile strength (kg./cm.$^2$) |
|---|---|---|---|---|
| | | Temp. (° C.) | Time (hr.) | |
| 8 | Methyl 2-(1-hydroxybutyl)acrylate | 120 | 2 | 1,050 |
| 9 | Methyl 2-(1-hydroxypropyl)acrylate | 120 | 2 | 1,100 |
| 10 | Methyl 2-($\alpha$-hydroxybenzyl)acrylate | 110 | 2 | 980 |
| 11 | 2-(1-hydroxymethyl)acrylonitrile | 130 | 2 | 1,020 |
| 12 | 2-(1-hydroxy-2-ethylhexyl)acrylonitrile | 110 | 2 | 1,110 |

EXAMPLE 13

A spinning solution of polyacrylonitrile containing 98.5 mol percent of acrylonitrile and 1.5 mol percent of 2-hydroxybutyl acrylonitrile was prepared by homogeneous solution polymerization in dimethylsulfoxide (DMSO), using azobisisobutyronitrile as the polymerization initiator. By DMSO-aqueous type wet spinning of the solution, fiber was prepared. The polymerization ratio was 83.4%/48 hrs.

Fifty (50) strands of this copolymer fiber (size: 3.43 deniers, strength: 3.47 g./d., elongation: 28.9%) were treated at 180° C. for 20 minutes in the air, under a tension of 0.1 g./d. The temperature was then raised at a rate of 5° C./min. up to 250° C., and treated for 40 minutes at the highest temperature. Thus obtained fiber was flame-resistant, and had a strength of 1.67 g./d. and an elongation of 6%.

When acrylonitrile homopolymer fiber was heat-treated under the identical conditions, the product was still combustible, and before it became flame-resistant, the fiber had to be kept at 250° C. for 90 minutes.

EXAMPLE 14

Fifty (50) strands of a copolymer fiber containing 97 mol percent of acrylonitrile and 3 mol percent of 2-hydroxyethyl acrylonitrile (size: 3.96 deniers, strength: 2.88 g./d., elongation: 27.3%) were heated to 300° C. in the air, with the rising rate of temperature of 4° C./min. from room temperature. Flame-resistant fiber was obtained consuming 70 minutes.

Since the heat treatment was performed under no tension, the resultant fiber was weak, and had the properties as given in Table 3 below.

For comparison, results of subjecting the same fiber to an identical heat treatment under a tension of 0.1 g./d. are concurrently given in the same table.

TABLE 3

| Treating conditions | Strength (g./d.) | Elongation (percent) | Reduction ratio in strength (percent) |
|---|---|---|---|
| Treatment under no tension | 0.98 | 4.5 | Approx. 68 |
| Treatment under a tension of 0.1 g./d. | 1.40 | 8.7 | Approx. 51 |

EXAMPLE 15

Fifty (50) strands of a copolymer fiber composed of 98.5 mol percent acrylonitrile and 1.5 mol percent of 2-methylhydroxybutyl acrylate (size: 3.86 deniers, strength:

3.10 g./d., elongation: 25.3%) were treated under a load of 0.15 g./d., at temperatures raised from room temperature to 240° C. at a rate of 3° C./min., and maintained at 240° C. for 2 hours. Thus obtained carbonized fiber had a strength of 1.32 g./d. and an elongation of 9.2%, and was flame-resistant. The strength reduction ratio was 57%.

When polyacrylonitrile fiber (size: 3.5 deniers, strength: 3.09 g./d., elongation: 29.3%) was treated under identical conditions, the product was combustible, and had a strength of 1.10 g./d. and an elongation of 5.7%. Presumably the strength will be further lowered if it is further heat-treated to be rendered flame-resistant.

EXAMPLE 16

Copolymer fibers composed of 95.9 mol percent of acrylonitrile and 4.1 mol percent of 2-hydroxylbutyl acrylonitrile (size: 2.53 d., strength: 3.31 g./d., elongation: 24.8%) were heated in the air under a load of 0.1 g./d., at temperatures raised from room temperature to 270° C. at a rate of 3° C./min. Thus pliable and highly flame-resistant carbonized fiber having a strength of 1.2 g./d. and an elongation of 11% was obtained after approximately 80 minutes of the heating.

When a polyacrylonitrile fiber same as that described in Example 15 was treated under the same conditions, the product was combustible, and had a strength of 1.05 g./d. and an elongation of 7.3%. The strength will presumably be further lowered if the fiber is further heat-treated until it becomes flame-resistant.

EXAMPLE 17

A plain weave fabric of 82 x 82 strands/in., 1,000 cm.², of a copolymer fiber composed of 98 mol percent of acrylonitrile and 2 mol percent of 2-hydroxyethyl acrylonitrile, was hung at the center of an air-tightly closed type double face for infrared radiator. The entire walls of the radiator was chromium plated to improve the reflection efficiency. The fabric was hung perpendicularly to the heater surface, at a distance of 15–20 cm. from the far infrared ray heater. At the lower end of the fabric, a load of 1 kg. was attached. The far infrared ray heater was formed of each four 200 v.–500 w. heaters of 60 cm. in length, provided at two sides. The intensity of the radiation was so adjusted that the temperature around the fabric reached 240° C. after 50 minutes from the initiation of radiation.

The temperature was then raised to 270° C. at a rate of 2° C./min., and maintained at 270° C. for 30 minutes. The resultant carbonized fabric was flame-resistant. The strength reduction ratio and elongation reduction ratio measured with an Instron tester were, respectively, 56% and 58%.

When a similar plain weave fabric of polyacrylonitrile fiber was heat-treated under identical conditions, the product was combustible, and degree of carbonization was insufficient.

EXAMPLE 18

Powder of polyacrylonitrile (relative viscosity=3.2) consisting of 2 mole percent of 2-(hydroxyethyl)acrylonitrile and 98 mole percent of acrylonitrile was calcined at 230° C. for 16 hours by heating. Further, the powder was subjected to a heat treatment at 450° C. for 2 hours under nitrogen reflux to obtain a black powder. Separately, polyacrylonitrile (relative viscosity=3.5) free of 2-(1-hydroxyethyl)acrylonitrile was similarly treated to obtain a control sample. By employing 10 grams each of the so heat-treated powders as catalyst, the dehydrogenation of isopropyl alcohol was carried out at 450° C. under nitrogen reflux. The isopropyl alcohol (10 ml.) was added to the system dropwise at a rate of 2 ml./hr. The reaction product was recovered every one hour, and the ratio of the resulting methyl ethyl ketone to the unreacted isopropyl alcohol was calculated from the area ratio by means of gas chromatography. The results are shown in Table 4 below.

TABLE 4

| Amount added of isopropyl alcohol (ml.) | Resulting acetone/untreated isopropyl alcohol (percent) | |
|---|---|---|
| | Copolymer catalyst of this invention | Homopolymer catalyst (control) |
| 2 | 58 | 34 |
| 4 | 44 | 22 |
| 6 | 26 | 10 |
| 8 | 24 | 8 |
| 10 | 11 | 4 |

What is claimed is:
1. A heat-treated product produced by heating to a temperature of 700°–3000° C. a copolymer preheated to a temperature within the range of 50° to 300° C., said copolymer consisting of:

(i) acrylonitrile
(ii) 0.05–20 mol percent to the acrylonitrile of a hydroxymethylacrylic compound of the Formula 1 below;

(1) 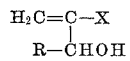

(wherein X is a radical selected from the group consisting of cyano, carboxyl, and carboxylate radical; and R is a member of the group consisting of hydrogen, alkyl radicals of up to 12 carbons, aryl radicals of up to 10 carbons, cycloalkyl radicals of up to 12 carbon, and arylalkyl radicals of up to 12 carbons); and (iii) 0–15 mol percent of a monomer or monomers copolymerizable with acrylonitrile.

2. The heat-treated product of claim 1 in which R is selected from alkyl radicals of 1–6 carbons.

3. The heat-treated product of claim 1 which is in the form of a fiber.

4. The heat-treated product of claim 1 which is in the form of a film.

5. A process for the production of a heat-treated product of an acrylonitrile copolymer which comprises preheating a copolymer consisting of:

(i) acrylonitrile
(ii) 0.05–20 mol percent to the acrylonitrile of a hydroxymethylacrylic compound of the formula (1) 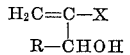

(wherein X is a radical selected from the group consisting of cyano, carboxyl and carboxylate radicals, and R is a member of the group consisting of hydrogen, alkyl radicals of up to 12 carbons, aryl radicals of up to 10 carbons, cycloalkyl radicals of up to 12 carbons, and arylalkyl radicals of up to 12 carbons); and (iii) 0–15 mol percent of a monomer or monomers copolymerizable with acrylonitrile in an oxidizing atmosphere at temperatures ranging from 50–300° C., and carbonizing the resulting pre-heated product by heating the same in a non-oxidizing atmosphere at temperatures ranging from 700–3,000° C.

References Cited

UNITED STATES PATENTS

| 2,521,914 | 9/1950 | Hagemeyer | 260—85.5 D |
| 2,601,659 | 6/1952 | Hearne et al. | 260—85.5 OT |
| 2,682,527 | 6/1954 | Dickey et al. | 260—85.5 OT |
| 3,499,024 | 3/1970 | Morita et al. | 260—85.5 OT |

HARRY WONG, JR., Primary Examiner

U.S. Cl. X.R.

8—55; 260—31.2, 32.6, 63, 73, 78.5, 80.6, 88.7, 881